United States Patent
Hottinen

[11] Patent Number: 5,936,950
[45] Date of Patent: Aug. 10, 1999

[54] DATA TRANSMISSION METHOD, RECEPTION METHOD, AND RECEIVER

[75] Inventor: Ari Hottinen, Vantaa, Finland

[73] Assignee: Nokia Telecommunications OY, Espoo, Finland

[21] Appl. No.: 08/827,185

[22] Filed: Mar. 27, 1997

[51] Int. Cl.[6] .......................... H04B 7/216; H04B 15/00; H04Q 7/00

[52] U.S. Cl. .......................... 370/342; 370/334; 375/200

[58] Field of Search .................. 370/310, 320, 370/321, 335, 337, 342, 334; 375/200, 206

[56] References Cited

U.S. PATENT DOCUMENTS

| | | | |
|---|---|---|---|
| 5,022,046 | 6/1991 | Morrow, Jr. | 370/342 |
| 5,260,968 | 11/1993 | Gardner et al. | 375/200 |
| 5,469,468 | 11/1995 | Schilling | 370/320 |
| 5,511,068 | 4/1996 | Sato | 370/335 |
| 5,533,013 | 7/1996 | Leppanen | 370/342 |

FOREIGN PATENT DOCUMENTS

WO 92/21195 11/1992 WIPO.
WO 95/20277 7/1995 WIPO.

OTHER PUBLICATIONS

International Search Report completed Oct. 21, 1998.
Mahesh K. Varanasi and Behnaam Aazhang, Multistage Detection in Asynchronous Code–Division Multiple–Access Communiations, IEEE Transactions on Communications, vol. 38, No. 4 Apr. 1990, pp. 509–519.

*Primary Examiner*—Alpus H. Hsu
*Assistant Examiner*—Afsar M. Qureshi
*Attorney, Agent, or Firm*—Pillsbury Madison & Sutro LLP

[57] ABSTRACT

A a data transmission and reception method and a receiver in which signals transmitted by various multiple access methods are processed. Signals transmitted by various multiple access methods can be transmitted and received in frequency ranges that overlap at least in part. During reception, signals received from one or more transmitters are converted to the desired baseband. Signals transmitted by one or more multiple access methods are separated from the received signal and from one another, and each separated signal is detected by a detector appropriate to the multiple access method used in the transmission of the signal concerned.

13 Claims, 2 Drawing Sheets

DATA TRANSMISSION METHOD, RECEPTION METHOD, AND RECEIVER

FIELD OF THE INVENTION

The invention relates to digital radio systems. In particular, the invention relates to a data transmission and reception method and a receiver in which signals transmitted by several multiple access methods are processed.

BACKGROUND ART

A central problem in the design and implementation of data transmission methods is simultaneous transmission and reception of signals from several simultaneous users in such a way that the signals interfere with one another as little as possible. Because of this and the transmission capacity used, various transmission protocols and multiple access methods have been developed, the most common of them especially in mobile phone communication being FDMA and TDMA methods and, recently, a CDMA method as well.

CDMA is a multiple access method based on a spread spectrum technique, and recently it has been put into use in cellular radio systems in addition to previously used FDMA and TDMA. In a CDMA method, a narrow-band data signal of a user is multiplied to a relatively broad band by a spreading code having a much broader band than the data signal. Bandwidths used in known test systems include e.g. 1.25 MHz, 10 MHz and 25 MHz. The multiplication spreads the data signal over the entire band to be used. All the users transmit simultaneously in the same frequency band. On each connection between a base station and a mobile station, a different spreading code is used, and the signals of the users can be separated from one another in the receivers on the basis of the spreading code of the user.

When a TDMA multiple access method is applied in a data transmission system, several frequencies are usually in use, each frequency being divided into time slots in which signals from different users are placed. Each user is thus assigned a time slot of his own. Since the frequency band reserved for the system is usually limited, the frequencies used must be repeated in cells located within a certain distance.

In a data transmission method in which a FDMA multiple access method is applied there are usually several frequencies in use, and each user communicates in his own narrow frequency band.

The different directions of transmission are typically at their own frequencies in all multiple access methods, although this is not compulsory.

For mobile phone networks, various standards have been designed in which different multiple access methods are used on the air interface. With an increase in the amount of mobile telecommunication, the number of systems used has risen. The systems are maintained by various operators, but one and the same operator may also maintain various systems. Local coverage areas of systems utilizing different multiple access methods may overlap, but until now they must have had different frequencies in order for their transmissions not to interfere with one another.

It is previously known that one and the same receiver is able to receive signals transmitted by different multiple access methods. The operation of these 'dual mode' receivers is based on the fact that signals transmitted by different multiple access methods are at different frequencies. Such receivers have been designed, for example, for CDMA/FDMA and TDMA/FDMA environments.

BRIEF DESCRIPTION OF THE INVENTION

The object of the present invention is to provide a data transmission method by which signals transmitted by different multiple access methods can be transmitted in overlapping frequency bands. A further object is to provide a receiver that is able to separate from one another the signals of the transmission sent by different multiple access methods and to detect a signal almost optimally. The object of the invention is to provide an arrangement in which no unsatisfactory compromises are necessary with respect to capacities of various systems used in one and the same area.

The object is achieved by a reception method of the invention, which comprises reception of signals sent by various multiple access methods in at least partly overlapping frequency ranges and conversion of the signals to the desired baseband, the signals being received from one or more transmitters; separation of the signals sent by one or more multiple access methods from one another; and detection of the separated signals by a detector appropriate to the multiple access method used in the transmission of the signal concerned.

The invention also relates to a receiver comprising conversion means for simultaneous reception of signals transmitted by different multiple access methods and conversion of the signals to the baseband, the signals being received from one or more transmitters and the frequency bands of the signals transmitted by different multiple access methods overlapping at least in part, and detection means operatively connected to the conversion means for simultaneous joint detection of signals transmitted by one or more multiple access methods.

The invention further relates to a data transmission method comprising simultaneous transmission of signals by various multiple access methods such that the frequency bands of the signals transmitted by different multiple access methods overlap at least in part and the signals are received from one or more transmitters.

Several advantages are achieved by the solution of the present invention. In the present solution, systems utilizing two or more multiple access methods can use a frequency band overlapping at least in part, and yet the receiver is able to detect the desired signal optimally. Mutual interference between the systems does not prevent reception of the transmissions.

The invention utilizes simultaneous joint detection of a plural number of signals by e.g. multi-user detection methods. It allows the capacity of the frequency band to be utilized advantageously and flexibly. A signal can be detected jointly in a receiver, for example, by an MLSE method or, alternatively, by using multistage detection.

The solution of the invention makes it possible for the operator to serve terminal equipments according to a plural number of standards by a single generic receiver.

BRIEF DESCRIPTION OF THE FIGURES

In the following the invention will be described in greater detail with reference to the examples illustrated in the attached drawings, in which.

DETAILED DESCRIPTION OF PREFERRED EMBODIMENTS

Figure 1:
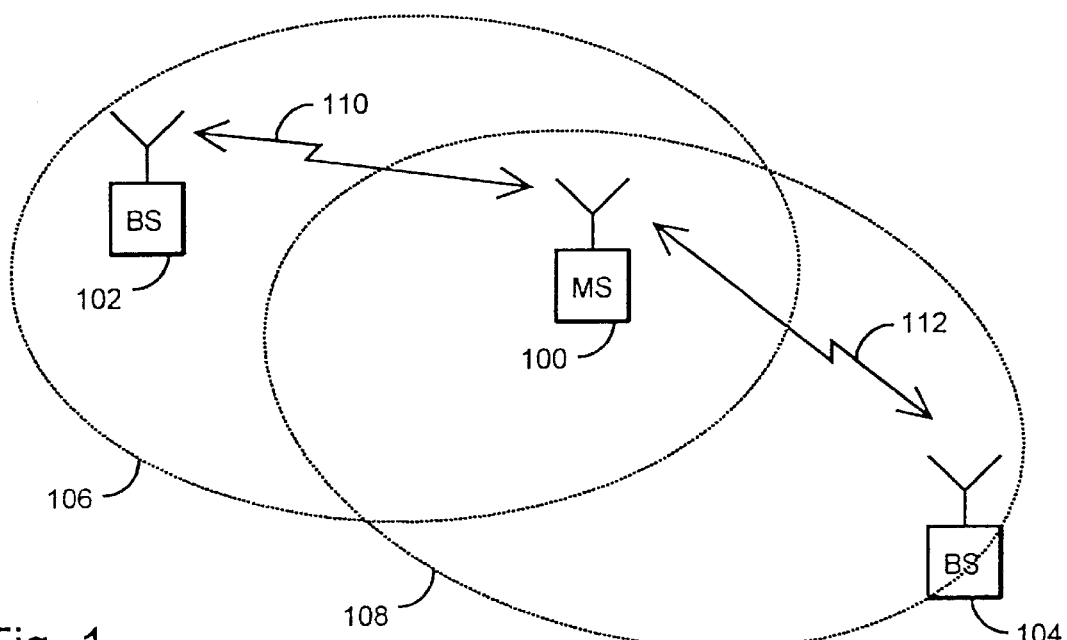
FIG. 1 illustrates an example in which there are two systems that use partly the same frequency range.

FIG. 1 shows a subscriber terminal equipment 100 and two base stations 102 and 104 in whose coverage areas 106, 108 the terminal equipment 100 is located. The base stations 102, 104 use different multiple access methods on the air interface. Assume that a TDMA method is used in the first base station 102 and a CDMA method in the second base station 104 and that the frequency ranges used by the base stations overlap in part.

Figure 2:
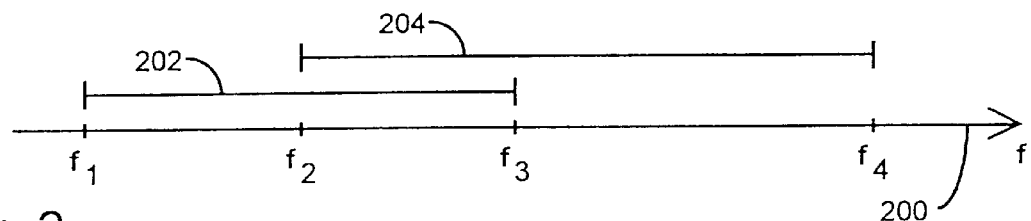
FIG. 2 illustrates partly overlapping frequency bands.

The above is illustrated by way of an example in FIG. 2, in which frequency f and four frequency values $f_1 < f_2 < f_3 < f_4$ are indicated in a horizontal axis 200. The first base station 102 is here assumed to transmit in frequency range 202, i.e. $f_1$–$f_3$, in the downlink direction, and the second base station in frequency range 204, i.e. $f_2$–$f_4$, in the downlink direction. It is pointed out that this is only an example and that the solution provided by the invention is not limited to such a distribution of frequencies between the base stations. The frequency ranges can also overlap either completely or in part. The same applies to the size and location of the coverage ranges 106, 108 of the base stations shown in FIG. 1.

The solution of the invention can also be applied such that one and the same physical base station sends both CDMA and TDMA (or FDMA) signals, the signals optionally belonging to different standards. This kind of situation may occur if one and the same base station is shared by several different systems.

Further, the solution of the invention can be applied by modelling an optimum receiver for different interference situations in which interfering signals sent by different multiple access methods are received from a neighboring band that has the same frequency. The interference may result, for example, from unideality or intermodulation. In a neighboring band, for example, there may be a number of users that do not normally interfere but whose signal leaks to another band when the power differences between the bands are great, as is often the case at the intersection of a pico cell and a macro cell.

The data transmission method of the invention comprises simultaneous transmission of signals by various multiple access methods such that the frequency bands of signals sent by different multiple access methods overlap at least in part and that the signals are received from one or more transmitters. In the example of FIG. 1, the multiple access methods are thus TDMA and CDMA. In a receiver, a standard TDMA can be interpreted as a CDMA signal in which all chips of the spreading code are one.

Figure 3:
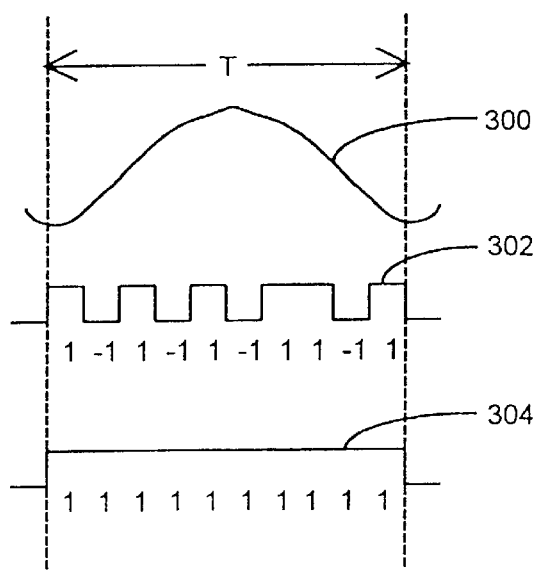
FIG. 3 illustrates modelling of a TDMA signal as a CDMA signal.

Let us now study FIG. 3. The figure shows a TDMA symbol 300 with a length T. A corresponding CDMA signal is of form 302, if the symbol rate is the same. In a CDMA signal, the chip rate is thus greater than the symbol rate; in the example of the figure it is 10-fold. A TDMA signal can thus be modelled as a CDMA signal in which all the chips of the spreading code are one 304.

By way of an example, an asynchronous system is described below in which the method of the invention can be applied. It will be obvious to a person skilled in the art that the invention can also be applied in a synchronous system in a corresponding manner.

Assume a CDMA system has K users, each user being given a spreading waveform $$s_k(t) = \sum_{j=1}^{N} S_k^{(j)} \Pi_{T_c}(t - jT_c)$$

where the jth chip or bit of the spreading waveform of the kth user is obtained from $$S_k^{(j)} \in \{-1,1\}, k=1, \ldots, K.$$

Here $T_c$ is the chip length and N is the chip number of the spreading waveform. The chip rate is $f_c = 1T_c$, here 5.12 MHz, and the lowest symbol length T is 20 ksymbol/s. The users send information by modulating the spreading waveforms by data symbols $b_k^{(i)} \in A$, where A is a symbol alphabet, which in the case of BPSK is $\{-1,1\}$. The signal waveform of user k, which is modulated by M information bits, starting from the ith bit, is obtained from $$w_k^{b_k^{(i)}}(t) = \sum_{i=-P}^{P} \sum_{m=0}^{M} \sqrt{\frac{E_k}{T}} s_k(t - iT - mT_M) b_k^{(iM+m)} e^{j2\Pi t f_k}$$

where $f_k$ is the transmission frequency of user k. In the formula, the waveforms are assumed to be normalized, i.e.

$$\int_{-\infty}^{\infty} s_k^2(t) dt = 1 \forall k, m.$$

To make the symbol rate M-fold, subcodes of length $T_M$ are modulated. The transmission power rises simultaneously M-fold, so that $E_b/N_o$, remains the same.

Different multiple access methods can be modelled by the above symbol descriptions. In CDMA, $T_c$ is considerably smaller than the symbol rate, and all users are in the same frequency band, i.e. carrier frequencies $f_1 = \ldots \neq f_k$. In FDMA, each user is assigned a frequency band (f1≠. . .=fk) of his own. In current TDMA systems, $T_c = T$ for all users, but T is much shorter than the corresponding value in CDMA, since the users are allocated their own time slots. By the solution of the invention, it is possible to implement a receiver that is able to process combinations of the above signals in a more varied manner than before.

The superimposed signal from several transmitters using various multiple access methods detected by a receiver can be presented generally as $$r(t) = \sum_{k=1}^{K} \sum_{i=-P}^{P} h_k(t) * w_k^{b_i}(t - iT) e^{j2\Pi t f_k} + n(t) \quad (1)$$

where n(t) represents white Gaussian noise with variance $\sigma^2$, 2P+1 stands for the length of the data packet, $h_k(t)$ stands for the impulse response of the physical channel of the kth user. The symbol * represents convolution. The waveforms and carrier frequencies of the signals are arbitrary. For the sake of simplicity, the users are here assumed to have the same symbol alphabet (BPSK), although this is not necessarily the case.

Let us first study a known multiple standard receiver of a single user. When delays τ are known, the signal of the kth user is despread as follows. The receiver receives a signal r(t) and correlates the signal with a matched receiver filter $S_k^*$, i.e.

$$z_{k,l}^{(i)} = \int_{iT+\tau_{k,l}}^{(i+1)T+\tau_{k,l}} r(t) s_k^*(t - \tau_{k,l} - iT) e^{-j2\Pi f_k} dt \quad (2)$$

The outputs of the matched filters of the kth user are collected in the vector $z_k^{(i)} = (z_{k,1}^{(i)}, \ldots, z_{k,l}^{(i)})$, and a desired decision algorithm (e.g. Viterbi) is used separately for each user. Another alternative is joint use of the algorithm over a given output queue of matched filters $(z = (z_k^{(-P)}, \ldots, z_k^{(P)})^T)$.

With regard to the desired signal, the signals from other frequencies or time slots are seen as interfering signals. Since the frequencies and time slots are not completely separate from one another, the interference may be significant, degrading the system capacity. Because of this, there should be sufficient guard bands between the time slots and different frequencies. This may lead to unefficient use of the spectrum.

In the solution of the invention, the receiver collects the outputs of all K channels over several overlapping frequencies and time slots in the vector $$z^{(i)} = (z_1^{(i)}, \ldots, z_K^{(i)})$$

and makes a joint decision over one or more samples from several channels $z = (z^{(-P)}, \ldots, z^{(P)})$, which are separated incompletely from one another by a carrier frequency, by time or by a spreading code. Typically, the receiver needs certain signal parameters for the detection. The number and quality of the parameters depends on how the receiver is implemented. For example, coherent receivers need complex coefficients of a multipath channel; a maximum ratio combiner also needs amplitudes.

In the following, the signal parameters needed will be discussed in greater detail. The amplitude concerning the ith symbol in the Ith path of the kth user is indicated by $\alpha_{k,l}^{(i)}$. Paths here mean received signal components that have propagated along different paths. Amplitudes $$a_{k,1}(t) \equiv \sqrt{\frac{E_k}{T}} h_{k,l}$$

are assumed to be constant during a symbol interval. The amplitudes of the channel coefficients of the kth user are collected at the ith time interval in the form $$\alpha_k^{(i)} = (\alpha_{k,1}^{(i)}, \ldots, \alpha_{k,L}^{(i)})^T.$$

The matrix of received signal amplitudes of all K users is then defined:

$$A^{(i)} = diag(\alpha_1^{(i)}, \ldots, \alpha_K^{(i)}).$$

Correlation between the Ith multipath-propagated signal component of the kth user and the I'th multipath-propagated signal component of the k'th user is obtained from $$\left[R_{k,k'}^{(n)}\right]_{l,l'} = \int_{-\infty}^{\infty} s_k(t - \tau_{k,l}) e^{j2\Pi t f_k} s_{k'}^*(t - \tau_{k',l'} + nT) e^{j2\Pi t f_{k'}} dt.$$

The terms are then collected in matrices $$R^{(n)} = \begin{bmatrix} R_{1,1}^{(n)} & \cdots & R_{1,K}^{(n)} \\ \vdots & \vdots & \vdots \\ R_{K,1}^{(n)} & \cdots & R_{K,K}^{(n)} \end{bmatrix}$$

and $$R_P = \begin{bmatrix} R^{(0)} & \cdots & R^{(-2P)} \\ \vdots & \vdots & \vdots \\ R^{(2P)} & \cdots & R^{(0)} \end{bmatrix}.$$

Matrix $R_P$ comprises correlations that affect the despread signal over 2P+1 symbol intervals. Hereinafter, correlation matrix $R_P$ for 2P+1 symbols is indicated by R. Signals s(.) in the above equations include the carrier frequency and signal pulse shape, so the matrices include correlations between adjacent frequency channels, partly overlapping channels, multiple access interference and intersymbol interference.

The statistics of the received signal can be expressed as $$z = RAb + n,$$

where $A = diag(A^{(-P)}, \ldots, A^{(P)})$ and $b = (b^{(-P)}, \ldots, b^{(P)})^T$, in which $b^{(i)} = (b_1^{(i)} I^T, \ldots, b_K^{(i)} I^T)$. Here $I = (1, \ldots, 1)^T$ is an L-vector.

The parameters of the received signal, such as delays and amplitudes, are estimated in the receiver, and, assuming that the signal has propagated in a Gaussian channel, a parametric detector according to the prior art, for example a Maximum Likelihood detector ML, solves the equation $$b_{opt} = \arg\min \|z - RAb\|_{R^{-1}}^2,$$

where $\|y\|_c^2 = y^H C y$ and C is the weighting matrix.

The above equation is difficult to solve in practice, since the complexity of the optimum solution depends exponentially on the number of paths L to be solved and on the number of users K.

To solve the equation, some simplifications can be made. First, the model order (the number of correlating channels) can be reduced, if some correlations are below the threshold given. In the GSM, for example, correlations between adjacent carrier frequencies sent at the same power level can be assumed to be so small that they need not be taken into account. Because of this, the model is solved in small parts separately, or jointly. With K users in the GSM, the complexity of optimum single-user demodulation is $K2^L$, where L is the number of user paths. (To clarify the equation, L is the same for all uses.) This is a notable simplification as compared with optimum multi-user complexity, $2^{KL}$. The loss of accuracy is small if correlations on adjacent channels are small.

One approach to reduction of the problem complexity is to apply suboptimum solutions instead of optimum MLSE. Solutions to the formulae given below can be searched, for example, by iterative methods. Suitable methods are presented, for example, in M. Varanasi, B. Aazhang: 'Multistage detection in asynchronous code division multiple access communications,' *IEEE Trans. Commun.*, Vol. 38, pp. 509–519 April 1990. If transmission powers at adjacent frequencies differ greatly, the above-described simplification cannot be made.

The receiver can be tuned, for example, as follows:

$$\hat{b}(m+1) = dec[\overline{A}(z - (R - I) A \hat{b}(m))] \quad (3)$$

where $$\bar{A} = (I_{K(2P+1)} \otimes l_L^T) A^*. \quad (4)$$

Here $\otimes$ stands for the Kroneker product and dec(.)≡sign ($\Re$(.)) for BPSK modulation. Matrix A conducts maximum ratio combination for all users over 2P+1 symbols. Conventional detection $\hat{b}(0) = \text{dec}[\bar{A}z]$ can be used as initial iteration values.

For the sake of simplicity, the above formula does not include antenna diversity. With the antenna diversity, signals of the different antenna elements are summed.

A corresponding sequential algorithm over N symbols is a windowed version of the above formulae (3) and (4), i.e.

$$\hat{b}_N^{(i)}(m+1) = \text{dec}[\bar{A}_N^{(i)}(z_N^{(i)} - (R_N - I)A_N^{(i)}\bar{b}_N^{(i)}(m))] \quad (5)$$

where $$\bar{A}_N^{(i)} = (I_{KN} \otimes l_L^T) A^*{}_N^{(i)}. \quad (6)$$

For the windowed amplitudes and outputs of the matched filters, it holds true that $$A_N^{(i)} = \text{diag}(A^{(i-N)}, \ldots, A^{(i+N)}) \text{ and}$$

$$z_N^{(i)} = (z^{(i-N)}, \ldots, z^{(i+N)})^T.$$

The above reception method can be called a centralized method, since it assumes that the interfering signals (and their parameters) are known.

The method is particularly well suited for use in a base station. The receiver can be easily modified to be a receiver that uses simultaneous multi-user detection.

Let us then consider an example in which a base station applying a CDMA multiple access method can serve a user that applies a TDMA method. In these methods, the frequency bands naturally differ from one another with respect to the width. For example, it can be assumed that a CDMA system band $W_1 = 1$ MHz and a TDMA user band $W_2 = 200$ kHz.

When a TDMA terminal equipment wants to set up a connection, it sends a heavily coded connection setup burst. The burst is received by a base station, which also checks whether it is possible to serve the TDMA user, i.e. whether any cell capacity is available. If the answer is yes, the base station sends the TDMA terminal equipment a permission to start transmission. The base station simultaneously reserves signal processing capacity for joint reception of CDMA and TDMA signals; during the reception, signals transmitted by different methods are separated from one another. If necessary, the TDMA user adds to the coding of the signal, so that the transmission power can be dropped and thereby the interference for CDMA users reduced.

In the opposite example, a base station applying a TDMA multiple access method can serve a user that applies a CDMA method. The procedure is otherwise identical to the above example, except that the CDMA user has to proceed to use a narrower TDMA band $W_2$ such that it repeats each spreading code chip $W_1/W_2$ times. Because the frequency band is the same, the reception filters can also be the same. Possible different modulation methods should naturally be taken into account. Because CDMA transmission is continuous, the transmission power used is not bursty like in the case of the TDMA. The transmission power of a CDMA user will here not be problematic to a TDMA user.

Figure 4:
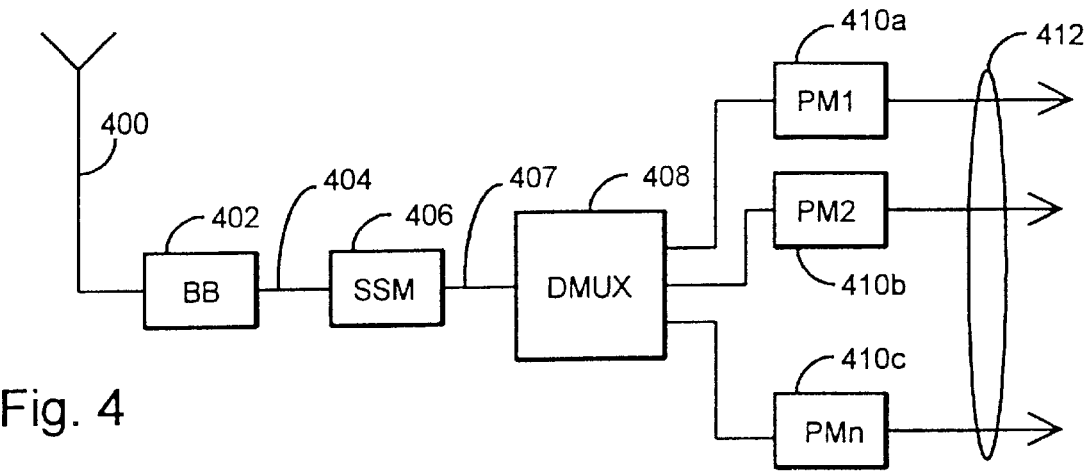
FIG. 4 is a block diagram illustrating a first embodiment of the structure of a receiver according to the invention.

In the following, we shall study the structure of a receiver according to the invention with reference to the block diagram of FIG. 4. The receiver comprises an antenna 400 receiving a signal that is supplied to prior art conversion means 402. In the conversion means, the signal is converted to the baseband to digital form by a baseband suitable for the systems. For example, in a TDMA/CDMA joint receiver, a baseband frequency band is selected in accordance with the CDMA.

A baseband, digitalized signal 404 is supplied to signal separating means 406. The separating means 406 process jointly all the received signal components, possibly sent by different multiple access methods, that interfere with one another. In the separating means, joint detection is conducted on the received signals, using a known joint detection method. The output of the separating means comprises channel symbols of different received signals, the symbols being supplied through a demultiplexer 408 to post-processing means 410a to 410c, which disassemble the frame and modify the stream of information. If the receiver is, for example, a base station receiver, the post-processing means 410a to 410c add to the information a piece of information indicating the system from which the signals are coming. In practice, the post-processing means 410a to 410c can be implemented by one or more signal or general processors or separate logic circuitry. From the post-processing means, the signal 412 is forwarded to the other parts of the receiver. A receiver of the invention naturally also comprises other components, such as filters, as obvious to a person skilled in the art.

Figure 5:
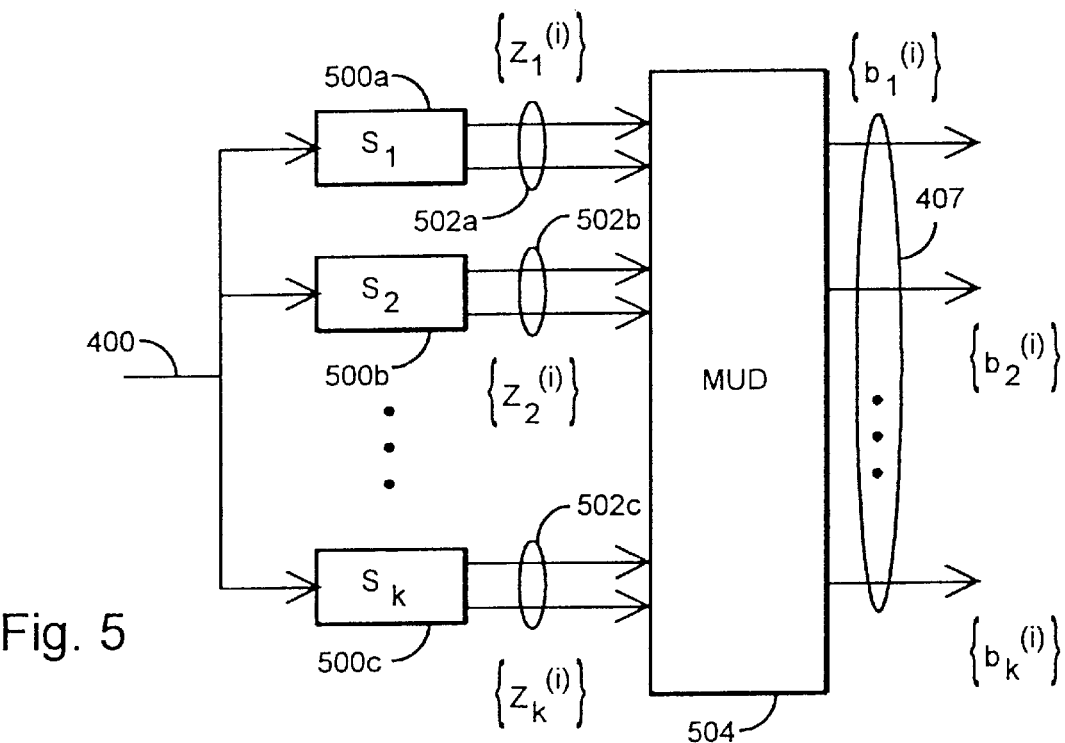
FIG. 5 is a block diagram illustrating the structure of a signal separating block in greater detail.

In the following, implementation of the separating means 406 will be studied in greater detail with reference to the block diagram shown in FIG. 5. At the input of the separating means, a signal 404 converted to the baseband to digital form is received. The signal is supplied to a number of despreading means 500a to 500c, in which the signal is processed with matched filters. The output signals 502a to 502c of the despreading means 500a to 500c comprise signals $z_k^{(i)}$ according to above formula (2), the signals being forwarded to detection means 504, in which the signals are detected jointly such that the output signal 407 comprises channel symbols $\bar{b}_k^{(i)}$ of different received signals. In practice, the separating means 406 can be implemented by means of a signal processor, general processor or separate logic circuitry.

Figure 6:
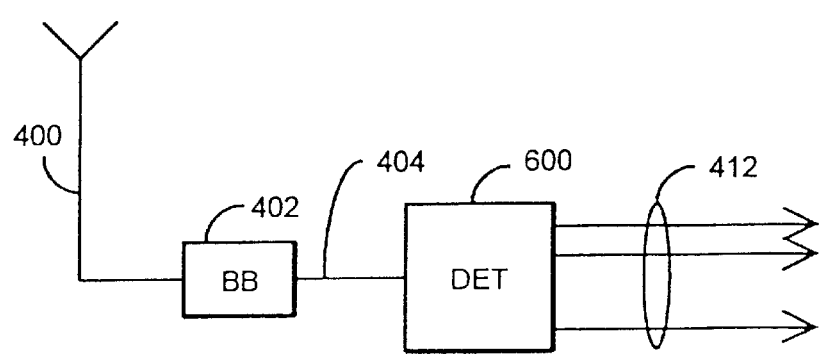
FIG. 6 is a block diagram illustrating a second embodiment of the structure of a receiver according to the invention.

The receiver has been described above as a multistage receiver. The receiver can also be implemented by conducting joint MLSE detection. That kind of receiver is illustrated in FIG. 6. The receiver comprises an antenna 400 receiving a signal that is supplied to prior art conversion means 402. In the conversion means, the signal is converted to the baseband to digital form by a baseband suitable for the systems. For example, in a TDMA/CDMA joint receiver, the baseband frequency band is selected in accordance with the CDMA. A baseband, digitalized signal 404 is supplied to detection means 600, where joint detection is carried out in accordance with the MLSE principle. In practice, the detection means 600 can be implemented by means of a signal processor, general processor or separate logic circuitry. In an ML equation, all possible bit combinations ($2^{KL}$) are considered, and the one that maximizes the ML equation is selected. A Viterbi algorithm can be used for simplifying the calculations. From the detection means 600, the signal 412 is forwarded to other parts of the receiver. The receiver of the invention naturally also comprises other components, such as filters, as is obvious to a person skilled in the art.

Although the invention is described above with reference to the example illustrated in the attached drawings, it is to be understood that the invention is not restricted thereto but can be modified in many ways within the scope of the inventive idea presented in the attached claims.

I claim:

1. A receiver comprising:

conversion means for simultaneous reception of signals sent by different multiple access methods and conversion of the signals to a baseband, the signals being received from one or more transmitters, and the frequency bands of said signals being sent by different multiple access methods overlapping at least in part; and detection means operatively connected to the conversion means for simultaneous detection of signals transmitted by one or more of said different multiple access methods.

2. A receiver comprising:

conversion means for simultaneous reception of signals sent by different multiple access methods and conversion of the signals to a baseband, the signals being received from one or more transmitters, and the frequency bands of said signals sent by different multiple access methods overlapping at least in part; and separating means operatively connected to the conversion means for separating signals sent by one or more of said different multiple access methods from one another and for jointly detecting the signals sent by one or more of said multiple access methods.

3. A receiver according to claim 2 further comprising: demultiplexing means operatively connected to the separating means, and plurality of processing means coupled to the demultiplexing means; the demultiplexing means being arranged to pass the separated signals obtained from the output of the separating means to different ones of said plurality of processing means, each of said plurality of processing means adding an identity to the signal processed, said identity indicating the multiple access method by which the signal has been transmitted.

4. A receiver according to claim 2 in which the separating means simultaneously process signals sent by one or more of said multiple access methods such that the output of the separating means comprises channel-coded symbols for the desired transmissions.

5. A receiver according to claim 2 in which the separating means comprise means for processing the received signal by filters matched with the signal and means operatively connected to the filters for detecting signals sent by one or more of said multiple access methods using the MUD method.

6. A receiver according to claim 2 in which the detection means detects a CDMA signal multiplied by the spreading code given.

7. A receiver according to claim 2 in which the detection means detects a TDMA signal.

8. A receiver according to claim 2 in which the detection means detects a FDMA signal.

9. A reception method comprising: receiving signals transmitted by various multiple access methods in partly overlapping frequency ranges;

converting the signals to a desired baseband, the signals being received from one or more transmitters, and simultaneously detecting the signals transmitted by one or more of said multiple access methods from the received signal.

10. A reception method comprising:

receiving signals transmitted by various multiple access methods in partly overlapping frequency ranges;

converting the signals to a desired baseband, the signals being received from one or more transmitters, separating the signals transmitted by one or more of said multiple access methods from the received signal with matched filters, and jointly detecting the separated signals.

11. A method according to claim 10 in which jointly detecting signals simultaneously transmitted by one or more of said multiple access methods from the received signal is conducted by a simultaneous multi-user detection algorithm to find channel-coded symbols for the desired transmissions.

12. A method according to claim 10 in which some of the received signals are transmitted by FDMA, TDMA and CDMA multiple access methods.

13. A method according to claim 12 in which a signal transmitted by said TDMA method is transmitted in the midst of said signal transmitted by a CDMA method such that it corresponds to a CDMA signal multiplied by a spreading code all the bits of which have a value of the same sign.

* * * * *